United States Patent [19]

Alford et al.

[11] Patent Number: 4,677,082

[45] Date of Patent: Jun. 30, 1987

[54] COMPOSITION COMPRISING CERAMIC PARTICLES

[75] Inventors: Neil M. Alford; James D. Birchall, both of Chester; Anthony J. Howard, Warrington; Kevin Kendall; James H. Raistrick, both of Cheshire, all of United Kingdom

[73] Assignee: Imperial Chemical Industries PLC, London, England

[21] Appl. No.: 798,020

[22] Filed: Nov. 14, 1985

[30] Foreign Application Priority Data

Nov. 20, 1984 [GB] United Kingdom ............... 8429316

[51] Int. Cl.$^4$ ............... C04B 35/10; C04B 35/14; C04B 35/46; C04B 35/56

[52] U.S. Cl. ............................. 501/88; 501/1; 501/103; 501/127; 501/134; 501/153; 501/154; 524/424; 524/430; 524/435; 524/437

[58] Field of Search ............... 428/402; 524/503, 424, 524/430, 435, 437; 501/1, 154, 134, 153, 103, 127

[56] References Cited

U.S. PATENT DOCUMENTS

| | | | |
|---|---|---|---|
| 3,352,814 | 11/1967 | Collins, Jr. et al. | 501/1 |
| 3,442,668 | 5/1969 | Fenerty et al. | 501/1 |
| 4,233,077 | 11/1980 | Hazel | 501/1 |
| 4,301,020 | 11/1981 | Johnson, Jr. et al. | 501/1 |

FOREIGN PATENT DOCUMENTS

| | | |
|---|---|---|
| 51-029170 | 8/1976 | Japan. |
| 55-115436 | 2/1979 | Japan. |
| 55-113510 | 2/1979 | Japan. |

OTHER PUBLICATIONS

Journal of the American Ceramic Society vol. 67, No. 3, pp. 199 to 203, 1984.
Derwent Abstract No. 74-66606, vol. 38, 9/74.

*Primary Examiner*—Allan M. Lieberman
*Attorney, Agent, or Firm*—Cushman, Darby & Cushman

[57] ABSTRACT

A homogeneous composition comprising
(1) at least one particulate ceramic material, and
(2) a liquid medium, in which the composition comprises at least 50% by volume of particulate ceramic material, in which the particulate ceramic material and liquid medium are selected such that a test composition has a friction coefficient of less than 0.2, and in which the particulate ceramic material has a mean aspect ratio of less than 1.70, a shaped article produced from the composition, a shaped article from which the liquid medium has been removed, and a product in which the particles of ceramic material have been sintered.

23 Claims, No Drawings

COMPOSITION COMPRISING CERAMIC PARTICLES

This invention relates to a composition comprising particulate ceramic material, to a shaped article produced from the composition, and to a product produced from the shaped article in which product the particles of ceramic material have been sintered in order to densify the product.

It is to be understood that in this specification, by the term "particulate ceramic material", there is meant any solid inorganic particulate material the particles of which can be caused to sinter together by the application of heat.

It is known to produce products from particulate ceramic materials by compacting the particles under high pressure in a dry state followed by heating of the thus formed article in order to sinter the ceramic particles. This known process suffers from the disadvantages that high pressures are required, the volume fraction of the particulate ceramic material in the shaped article is relatively low, generally no greater than 50% by volume, although in exceptional circumstances, eg. where very high pressures are used, it may be as high as 60% by volume, and the articles which may be produced are generally of small size and of simple shape.

Mouldable compositions of particulate ceramic material are also known which comprise particulate ceramic material and a liquid medium. The liquid medium may be water, and such compositions may also contain a clay, or they may contain an organic polymer which is soluble in or at least dispersible in water. The presence of the clay, or of the organic polymer, aids in the production of a coherent composition which is mouldable. The compositions may be sufficiently fluid to be moulded and may be shaped by application of a relatively low pressure. Shaped articles may be produced from such mouldable compositions and thereafter the liquid medium may be removed from the composition, the polymer if present may be burned out of the shaped article, and the particles of ceramic material therein may be sintered.

Such compositions and methods of production are of course well-known in the pottery art.

Although such mouldable compositions may be shaped by application of at most a relatively low pressure, in contrast to the processing of particulate ceramic materials in the dry state, it has hitherto proved to be difficult to produce a shaped article from such a mouldable composition which contains a high volume fraction of particulate ceramic material, for example of greater than 50% by volume. Where such a shaped article possessing a relatively low volume fraction of particulate ceramic material is further processed, that is where the organic polymer, if present, is burned out and the particles of ceramic material are sintered in order to produce a densified product, substantial shrinkage may occur with the result that cracks may appear in the shaped article and in the product produced therefrom. A further consequence of the use of relatively low volume fractions of ceramic material is that very high temperatures and long furnace residence times may be required in order to achieve sintering of the particles of ceramic material, and there may be non-uniformity in the microstructure of the product with resultant mechanical weakness.

It is also known to produce shaped articles from compositions containing particulate ceramic material which also contain a polymeric material as a binder for the particulate ceramic material. Such compositions may be shaped at elevated temperature, e.g. by extrusion, and the polymeric material in the resultant shaped article may be burned out and the particles of ceramic material which remain may be sintered. In order to shape such compositions an elevated temperature must be used at which the polymeric material is liquid, and, prior to sintering of the particles of ceramic material, it is necessary to remove the polymeric material from the shaped article, e.g. by burning. The polymeric material may comprise a substantial proportion of the volume of the shaped article and the burning may leave substantial voidage in the shaped article.

Examples of the production of shaped articles from a composition comprising particulate ceramic material and polymeric material include the following.

Japanese patent publication No. 55-115436-A describes injection moulding or extruding a composition of a ceramic or metal powder and a resin of polystyrene, atactic polypropylene, polyethylene, a lubricant, and a plasticiser.

Japanese patent publication No. 55-113510-A describes injection moulding or extruding a composition of ceramic or metal powder and a polyalkene resin cross-linked with a silane.

Japanese patent publication No. 76-029170-B describes an injection mouldable composition comprising a ceramic material such as alumina or zirconia and atactic polypropylene, wax, and a plasticiser such as ethyl phthalate or butyl phthalate.

GB patent No. 1 426 317 describes a composition which may be moulded and which comprises ceramic material and atactic polypropylene as binder. The composition may comprise an additional thermoplastic resin, a plasticiser, and/or a lubricating agent. The organic matter may be decomposed and volatilised by heating the shaped article at 340° to 380° C. and the final firing to sinter the ceramic material may be effected at 1600° to 1650° C.

In recent years there has been considerable interest shown in the production of so-called "hightechnology ceramics", also known as high performance ceramics, technical ceramics and structural ceramics. High technology ceramics have good mechanical properties under stress, good electrical properties, and resistance to high temperatures and to corrosive environments. Such high-technology ceramics are finding uses in automotive applications, in heat exchanger applications and as nozzles for burners. The good electrical properties of high-technology ceramics enables them to be used in capacitors, in piezoelectric devices, and as substrates for integrated circuits.

High technology ceramics may be produced from particulate ceramic materials by a process which comprises compacting the material under high pressure and heating the thus compacted material in order to sinter the ceramic particles. Particulate ceramic materials of uniform particulate size are selected, and the materials may also be of small size, for example, a size below 0.5 micron. By use of a compaction and sintering process it is possible to produce a ceramic product from such selected particulate ceramic materials which contains very little void space, and which may have a density of up to 99% of the theoretical maximum. However, such a process suffers from the disadvantage that it is only possible to produce products of relatively small size and of relatively simple shape.

An example of such a process is described in Journal of the American Ceramic Society Volume 67, No. 3, pages 199 to 203, 1984. In this reference there is described spray-drying a composition comprising water, polyvinylalcohol, and alumina particles, and compacting the thus spray-dried particles at pressure ranging from 18 MPa to 345 MPa. The maximum level of compaction which is achieved, that is in the shaped article produced from the composition prior to subsequent sintering, corresponds to a relative density of up to 50%, that is, up to 50% of the density of alumina itself.

It would be very desirable to produce a composition prior to sintering which comprises a high volume fraction of particulate ceramic material and which is readily moulded by techniques such as those used in the plastics or rubber art.

The present invention relates to a composition which contains a high volume fraction of particulate ceramic material, which composition may readily be moulded by plastics or rubber processing techniques to produce a shaped article which may be of relatively large size and relatively complex shape and in which the particles of ceramic material are densely and uniformly distributed, without the necessity of using high pressures.

According to the present invention there is provided a homogeneous composition comprising
 (1) at least one particulate ceramic material, and
 (2) a liquid medium, in which the composition comprises at least 50% by volume of particulate ceramic material, in which the particulate ceramic material and liquid medium are selected such that a test composition has a friction coefficient of less than 0.2, and in which the particulate ceramic material has a mean aspect ratio of less than 1.70.

Provided that the particulate ceramic material and the liquid medium are selected such that the composition has a friction coefficient as defined of less than 0.2, and that the particulate ceramic material is selected to have the defined mean aspect ratio, it is possible to produce from the particulate ceramic material and the liquid medium a homogeneous composition which is readily moulded by plastics or rubber processing techniques to a shaped article of large size and complex shape, which may comprise a high proportion of particulate ceramic material, for example, greater than 60% by volume or even greater than 70% by volume, and to produce from the shaped article a sintered product having reliable properties, which contains a high proportion of ceramic material, and the density of which may closely approach or may even attain the theoretical density.

On the other hand, where a composition comprises particulate ceramic material and liquid medium in the same high proportion and the composition has a friction coefficient of greater than 0.2 and/or the particulate ceramic material has a mean aspect ratio of greater than 1.70 the composition is much less readily moulded, and it may not be possible to produce from the composition a cohesive shaped article by plastics or rubber processing techniques. In order to produce a composition which is readily moulded it may be necessary to use in the composition a substantially lower proportion of particulate ceramic material.

The friction coefficient of the composition is determined according to the following test. A composition comprising ceramic material and liquid medium and containing the desired proportion by volume of particulate ceramic material is thoroughly mixed and the particles of ceramic material dispersed, e.g. by application of high shear, and the composition is placed on a flat surface, the height of the composition above the surface being at least 18 mm. Thereafter, a cylindrical ram of diameter 13 mm is applied to the composition, with the whole of the surface of the end of the ram in contact with the composition, and the load on the ram is increased to 5000 Newtons at which load the thickness "t" of the composition between the ram and the flat surface is determined. The friction coefficient is defined as $\mu$, where $$\mu = \frac{4}{3 + 13/t}$$

The test must be carried out over a range of ram speeds between 1 mm/min and 100 mm/min, within which range there must be at least one ram speed at which the friction coefficient is less than 0.2.

The friction coefficient test may be effected at ambient temperature. Alternatively, it may be effected at elevated temperature in order that the composition may satisfy the requirements of the test.

The shape of the particles of ceramic material is also an important factor in determining whether or not the composition may be readily moulded by plastics or rubber processing techniques. The shape of the particles of ceramic material, and the size of the particles, that is the maximum dimension, is assessed by dispersing the particles in a liquid medium, which may be for example an alcohol, but which is preferably a solution of an organic polymeric material in a liquid medium. Dispersion, and particularly the breakdown of aggregates, may be assisted by shearing the dispersion and/or by subjecting the dispersion to ultrasonic vibration. A sample of the dispersion is then examined by microscopy at several magnifications, the maximum dimension and the minimum dimension of at least 100 of the dispersed particles are determined, the aspect ratio for each particle thus examined is calculated, that is the ratio of the maximum dimension to the minimum dimension, and the mean aspect ratio of the particles in the sample examined is determined. The mean aspect ratio should be less than 1.70.

The present invention also provides a shaped article produced from the composition by shaping of the composition, a dried shaped article in which the liquid medium, or the liquid volatile components of the liquid medium, has been removed from the shaped article, and a product produced from the dried shaped article by heating of the shaped article in order to sinter the particles of ceramic material.

Whether or not a composition of the selected particulate ceramic material and liquid medium will satisfy the friction coefficient criterion will depend on a number of parameters. These parameters include, for example, the size of the particles of ceramic material, the size distribution of the particles, the shape of the particles, that is the aspect ratio, the degree of aggregation of the particles, and the nature of the liquid medium. These parameters are inter-related and, although no one factor is of paramount importance, selection of the parameters to satisfy certain preferred criteria assists in production of a composition which satisfies the friction coefficient criterion.

It is preferred that the particles of ceramic material are of relatively small size, for example a size of less than 5 microns. Particles having a size of less than 1 micron and even less than 0.2 micron are more preferred as the use of such particles enables sintering of the particles of ceramic material to be effected at lower temperatures and at faster rates than would otherwise be the case.

The particulate ceramic material may have a mono-modal size distribution, that is it may be all of substantially the same size, or it may be multi-modal, that is it may comprise a plurality of sizes. In this case the aforementioned aspect ratio feature applies to the whole of the multi-modal mixture of particles, but the preferred size criteria apply to each mode of the multi-modal mixture of particles. However, it is preferred to use a mono-modal particulate ceramic material as such a material may be sintered more uniformly when compared with a multi-modal particulate ceramic material such that the product produced from the composition may closely approach or even attain the theoretical density. Thus, it is preferred that the coefficient of variation in the size of the particles of ceramic material, that is the ratio of the standard deviation in size to the mean size be in the range from 0 to 0.5, the size being the maximum dimension determined by microscopy as hereinbefore described.

Thus, it is preferred that $$V_s = \frac{S_s}{\bar{x}_s}$$

where
$V_s$ is the coefficient of variation of size,
$S_s$ is the standard deviation about the mean size, and
$\bar{x}_s$ is the mean size of the particles.

The particles of ceramic material must have a mean aspect ratio of less than 1.70. In order, that the composition may be more readily moulded, particularly when the composition comprises a high proportion of particulate ceramic material, it is preferred that the mean aspect ratio of the particles of ceramic material is less than 1.50, and that the coefficient of variation in the aspect ratio, that is the ratio of the standard deviation in the aspect ratio to the mean aspect ratio, is between 0 and 0.5. Use of such a preferred particulate ceramic material assists sintering in a uniform manner.

Thus, it is preferred that $$V_a = \frac{S_a}{\bar{x}_a} = 0 \text{ to } 0.5$$

where
$V_a$ is the coefficient of variation of aspect ratio,
$S_a$ is the standard deviation about the mean aspect ratio, and
$\bar{x}_a$ is the mean aspect ratio.

Techniques are known for production of particles of ceramic material which are of small size, which have a preferred size distribution, and which have the required aspect ratio. For example, such particls of ceramic material may be produced by controlled hydrolysis of alkoxides, by oxygenolysis of volatile materials as in a plasma, e.g. oxygenolysis of aluminium chloride or silicon chloride in a plasma to produce alumina or silica, by gas phase hydrolysis of halides, e.g. in a hydrogen/oxygen flame, by controlled precipitation from an aqueous solution of a suitable salt, and by thermal treatment of liquid droplets of precursor materials.

The nature of the liquid medium is an important factor in determining whether or not the composition satisfies the friction coefficient criterion.

The liquid medium is preferably liquid at ambient temperature, that is at about 20° C., as it will generally then be possible to mould the composition at ambient temperature and avoid the necessity of using elevated temperature, as is required where the composition comprises a particulate ceramic material and a polymeric material as binder, such as the polyethylene and atactic polypropylene hereinbefore described.

The liquid medium may be an aqueous medium or a non-aqueous medium, but for reasons of expense and of safety, e.g. non-flammability, it is preferred that it be an aqueous medium.

The liquid medium preferably contains an organic polymeric material in solution or dispersion in a liquid. The organic polymeric material acts as an aid to mixing of the components of the composition and as an aid to retention of shape in the shaped article produced from the mouldable composition, and it is preferred that the organic polymeric material be a water-soluble or water-dispersible material.

The use of a liquid medium which comprises an organic polymeric material in solution or dispersion in a liquid is preferred as, in subsequent processing of the shaped article, the liquid of the liquid medium is readily removed from the shaped article by heating at relatively low temperature, particularly in the case where the liquid is water. The use of such a liquid medium also has the further advantage over the use of a polymeric material as binder in that in the subsequent processing of the shaped article produced from the composition only a relatively small proportion of organic polymeric material has to be removed from the shaped article by burning.

Suitable water-soluble polymeric materials include, for example, cellulose derivatives, e.g. hydroxy propyl methyl cellulose; polyacrylamide, polyethylene oxide, and polyvinyl pyrollidone. A preferred polymeric material, which is particularly suitable for use in production of mouldable compositions having the required friction coefficient, is a hydrolysed polymer or copolymer of a vinyl ester, particularly a hydrolysed polymer or copolymer of vinyl acetate. The degree of hydrolysis of the polymer or copolymer of vinyl acetate is preferably at least 50%, more preferably in the range 70% to 90%, particularly where the composition is to be processed at or near ambient temperature.

Where the liquid medium comprises a solution or dispersion of an organic polymeric material in a liquid the concentration of the organic polymeric material will depend on a number of factors, for example, the nature of the organic polymeric material, the nature of the particulate ceramic material, for example, its mean aspect ratio, and on the relative proportions by volume of the particulate ceramic material and of the liquid medium. A concentration of organic polymeric material in the liquid medium in the range 5% to 60% by volume will generally suffice.

The liquid medium of the composition may comprise a liquid and a surfactant dissolved therein which serves to assist in dispersing the particles of ceramic material in the composition. The liquid medium may comprise a solution or dispersion of an organic polymeric material in a liquid and surfactant dissolved in the liquid.

Where the liquid medium of the composition comprises an organic polymeric material the liquid medium may also comprise a cross-linking agent for the organic polymeric material which may be caused to react with the organic polymeric material in the shaped article produced from the composition and thus assist in retention of shape of the shaped article.

The particulate ceramic material in the composition of the invention may be any inorganic particulate material provided the particles of the material can be caused to sinter by application of heat.

Thus, the particulate ceramic material may be an oxide or a mixture of oxides of a metallic or of a non-metallic element, for example, an oxide of aluminium, calcium, magnesium, silicon, chromium, hafnium, molybdenum, thorium, uranium, titanium, or zirconium. The ceramic material may be a carbide of, for example, chromium, hafnium, molybdenum, niobium, tantalum, thorium, titanium, tungsten, uranium, zirconium or vanadium, or a nitride of one of these elements. The ceramic material may be silicon carbide.

Within the scope of the term particulate ceramic material there is also included those metals which when in a powdered form can be sintered or fused together by application of heat, that is those metals which are susceptible of processing by the technique of powder metallurgy. Suitable metals include aluminium and its alloys, copper and its alloys, and nickel and its alloys.

The particulate ceramic material may be a mixture of particles, for example, comprising a mixture of a particulate metal or metals and/or a particulate ceramic non-metallic material or materials.

In the composition of the invention the particulate ceramic material is present in a proportion of at least 50% by volume by which we mean at least 50% by volume of the whole composition including any air which may be present. It is preferred that the proportion of particulate ceramic material in the composition be as high as possible, whilst still retaining mouldability in the composition, as the possibility of producing a product from the composition which has a high density and which approaches or even attains the theoretical density of the particulate ceramic material is thereby improved. It is possible for the composition of the invention to comprise more than 60%, and even more than 70%, of particulate ceramic material by volume of the composition and for the composition to remain mouldable. In order that the production of compositions which are mouldable and which contain such high proportions of particulate ceramic material may be assisted it is preferred that the friction coefficient of the composition as hereinbefore described should be less than 0.10, more preferably less than 0.05.

The composition of the invention should be homogeneously mixed, that is the particles of ceramic material should be homogeneously distributed throughout the composition, and the process by which the components of the composition are homogeneously mixed is of importance in achieving a composition which satisfies the friction coefficient criterion hereinbefore referred to. Indeed, it is possible that a composition comprising a given particulate ceramic material and liquid medium in a given proportion may not satisfy the friction coefficient criterion because the components of the composition may not have been mixed in a sufficiently intensified manner, but that the same components in the same proportion, when mixed in a more intensified manner, may result in a composition which does satisfy the friction coefficient criterion.

The process by which the components of the composition are mixed to achieve a homogeneous composition is thus important. The mixing is preferably effected under conditions of high shear, e.g. as in a screw extruder. However, it is preferred that mixing be effected on a twin-roll mill the rolls of which may be operated at the same or different peripheral speeds. The composition may be passed repeatedly through the nip between the rolls of the mill, which nip may be progressively decreased in size. The nip between the rolls of the mill may be decreased to a size as low as 0.1 mm with the result that very high shear may be applied to the composition which assists in breaking down aggregates of particulate ceramic material which may be present in the composition.

The composition of the invention may be moulded by plastics or rubber processing techniques, for example, by compression in a mould, by extrusion, by injection moulding, and particularly by calendering on a twin-roll mill to form sheets. Thus, mixing of the components of the composition and moulding of the composition into a sheet form, may be effected simultaneously on a twin-roll mill.

In order that the composition may be moulded at relatively low pressures it is preferred that the yield pressure of the composition of the invention be less than 1 MPa. Determination of the yield pressure may be effected when determining the friction coefficient of the composition (as hereinbefore described), in that the yield pressure Y is defined as $$Y = 0.0075 \text{ F MPa}$$

where F is the force in Newtons required on a cylindrical ram of diameter 13 mm to compress the composition from a thickness of at least 18 mm to a thickness of 13 mm.

Where the composition has been moulded into a shaped article of simple profile, e.g. a sheet, this shaped article may subsequently be converted into a shaped article of more complex shape, e.g. by charging the sheet to a mould of suitable shape and compression moulding the sheet to a shape of more complex profile in the mould.

The shaped article may be further processed to remove the liquid medium, or the liquid volatile components of the liquid medium, from the shaped article. This further processing, referred to as drying, may be accompanied by shrinkage of the shaped article. Desirably, the volume shrinkage on drying is equivalent to the volume of liquid medium, or liquid in the liquid medium, which is removed. Shrinkage on drying which is less than the volume of liquid medium, or liquid volatile components in the liquid medium, which is removed is an indication that voids have been formed in the dried shaped article. Drying may be effected in an oven, e.g. at a temperature of up to 100° C. or somewhat higher, particularly when the liquid in the liquid medium is water.

The product which is produced from the shaped article and in which the particles of ceramic material have been fused together may be produced by heating the article at high temperature in order to sinter the particles of ceramic material together, optionally with the application of pressure. The temperature at which sintering of the particles of ceramic material will be effected will depend on the nature of the ceramic material. This temperature will generally be above 1000° C., and may be above 1500° C.

Where the liquid medium in the composition of the invention comprises an organic polymeric material this material must be removed from the shaped article prior to sintering of the particles of ceramic material. The organic polymeric material may be removed by burning. Burning of the organic polymeric material may be effected by progressively increasing the temperature of the dried shaped article. The temperature should not be increased at a rate which results in such a rapid burn-out of the organic polymeric material that the structural integrity of the shaped article is disturbed.

The temperature to which the shaped article must be heated in order to remove the organic polymeric material will depend on the nature of the latter material, but a temperature of not greater than 500° C. will generally suffice.

The invention is illustrated by the following Examples.

In the following Examples the aspect ratios of, and thus the mean aspect ratios of the particulate ceramic materials and the coefficients of variation thereof, the sizes of, and thus the mean sizes of the particulate ceramic materials and the coefficients of variations thereof, and the friction coefficients of compositions containing particulate ceramic materials, were determined by the methods as hereinbefore described.

The packing fraction of the particulate ceramic material in the shaped composition and in the shaped article produced from the composition were determined by measuring the dimensions of the composition or article, and determining the volume of the composition or article therefrom. From a knowledge of the weight of the particulate ceramic material in the composition or article and the density thereof the volume of the particulate ceramic material in the composition or article, and thence the proportion by volume therein, that is the packing fraction, was determined.

The difference, if any, between the measured volume of the shaped composition or shaped article, and the volumes calculated from the known weights and densities of the components of the composition or article corresponds to the volume of air, if any, incorporated into the composition or article.

In each of the following Examples the liquid medium consisted of a liquid component and, generally, an organic polymeric material. Measured weights of particulate ceramic material and organic polymeric material, when used, were charged to an orbital action mixer and blended therein for 1 minute. A measured weight of liquid component, for example water, was then charged to the mixer and blending was continued for a further 30 seconds.

Unless otherwise stated, the resultant composition in the form of a crumble was removed from the orbital action mixer and charged to a twin roll mill and blended thereon by passing the composition repeatedly through the nip between the rolls of the mill which were rotating at different peripheral speeds. The nip between the rolls was progressively narrowed and the composition was subjected to a high shearing action.

The homogeneously mixed composition was removed from the mill in the form of a sheet and the dimensions of the sheet, and thus the volume of the sheet, were determined.

Thereafter, the sheet was heated in an oven at a temperature of 80° C. for 16 hours in order to volatilise the liquid in the sheet, for example water, the sheet was removed from the oven and allowed to cool to ambient temperature, and the dimensions of the sheet, and thus the volume of the sheet were determined.

EXAMPLE 1

Components of composition.

| Particulate ceramic material. | | |
|---|---|---|
| $TiO_2$ | mean aspect ratio $\overline{X}_a$ | 1.49 |
| | standard deviation about mean aspect ratio $S_a$ | 0.472 |
| | Coefficient of variation of aspect ratio $V_a$ | 0.32 |
| | mean size $\overline{X}_s$ | 0.19 micron |
| | Standard deviation about the mean size $S_s$ | 0.0669 micron |
| | Coefficient of variation of size $V_s$ | 0.35 |
| | Density | 4.05 g cm$^{-3}$ |
| Organic Polymeric Material. | | |
| Hydrolysed polyvinyl acetate (Gohsenol KH 17S) 80% hydrolysed. | | |
| Water. | | |

The components of the composition were mixed in the following proportions by volume.

| $TiO_2$ | 55.8% |
|---|---|
| Organic polymeric material | 13.1% |
| Water | 31.1% |
| Friction coefficient of the composition | 0.05 |

The composition was readily moulded on a twin-roll mill to produce a composition in the form of a cohesive sheet.

The packing fraction of the particles of $TiO_2$ in the composition in the form of a sheet removed from the mill, that is in the shaped composition, was 55.8% which is the same as the proportion in the initial composition, thus indicating that the sheet did not contain air.

After heating in order to volatilise the water from the sheet the packing fraction of the particles of $TiO_2$ was 60%, indicating that volatilisation of the water was accompanied by shrinkage.

The resultant shaped article, from which water had been removed, was heated to a temperature of 450° C. at a rate of 1° C. per minute in a furnace in order to burn off the hydrolysed polyvinyl acetate.

The article was then heated in a furnace at 1300° C. for 1 hour in order to sinter the particles of $TiO_2$.

The flexural strength of the resultant sintered product was determined by a three point bend test.

| Flexural strength | 241 ± 29 MPa |
|---|---|
| Weibull modulus | 8.4 |

By way of comparison a composition comprising 50% by volume of $TiO_2$ as used above and 50% by volume of water was mixed in an orbital action mixer. The mixture was crumbly and rather dry and it could not be formed into a cohesive, homogeneous composition.

The friction coefficient of the mixture was 0.39.

EXAMPLE 2

Components of Composition.

| Particulate ceramic material. | |
|---|---|
| SiO$_2$ mean aspect ratio $\bar{x}_a$ | 1.31 |
| standard deviation about mean aspect ratio $S_a$ | 0.217 |
| Coefficient of variation of aspect ratio $V_a$ | 0.167 |
| Mean size $\bar{x}_s$ | 0.13 micron |
| Standard deviation about the mean size $S_s$ | 0.005 micron |
| Coefficient of variation of size $V_s$ | 0.384 |
| Density | 2.2 g cm$^{-3}$ |
| Organic Polymeric Material. | |
| Hyrolysed polyvinyl acetate (Gohsenol KH 17S) 80% hydrolysed. | |
| Water. | |

The components of the composition were mixed in the following proportions by volume

| SiO$_2$ | 63.8% |
|---|---|
| Organic polymeric material | 8.2% |
| Water | 28.0% |
| Friction coefficient of the composition | 0.1. |

Friction coefficient of the composition 0.1.

The composition was readily moulded on a twin-roll mill to produce a composition in the form of a cohesive sheet.

The packing fraction of the particles of SiO$_2$ in the composition in the form of a sheet removed from the mill, that is in the shaped composition, was 61% which is slightly below the proportion by volume in the initial composition, indicating that the sheet contained a small proportion of air.

After heating in order to volatilise the water from the sheet the packing fraction of the particles of SiO$_2$ was 69%, indicating that volatilisation of the water was accompanied by shrinkage.

By way of comparison the above procedure was repeated except that the organic polymeric material was omitted from the composition and the composition comprised 57% by volume of SiO$_2$. The composition was extremely difficult to mould and could not be formed into a cohesive sheet. The friction coefficient of the composition was 0.38.

EXAMPLE 3

Components of composition.
Particulate ceramic material.
TiO$_2$ as used in Example 1.
Organic polymeric material
Hydrolysed polyvinyl acetate as used in Example 1.
Water
The components of the composition were mixed in the following proportions by volume.

| TiO$_2$ | 50% |
|---|---|
| Organic polymeric material | 11.6% |
| Water | 38.4% |
| Friction coefficient of the composition | 0.05 |

The mean aspect ratio of the particles of ceramic material and the friction coefficient of the composition were below the upper limits hereinbefore specified, and the composition was readily moulded on the twin-roll mill to produce a shaped article in the form of a cohesive sheet. By way of comparison the above procedure was repeated except that the TiO$_2$ was replaced by a particulate Al$_2$O$_3$ having the following characteristics.

| Mean aspect ratio $\bar{x}_a$ | 2.45 |
|---|---|
| Standard deviation about mean aspect ratio $S_a$ | 0.82 |
| Coefficient of variation of aspect ratio $V_a$ | 0.33 |
| Mean size $\bar{x}_s$ | 0.49 micron |
| Standard deviation about the mean size $S_s$ | 0.257 micron |
| Coefficient of variation of size $V_s$ | 0.524 |
| Density | 4 g cm$^{-3}$ |
| Friction coefficient of the composition | 0.46. |

The mean aspect ratio of the particles of ceramic material, 2.45, and the friction coefficient of the composition 0.46, were above the upper limits hereinbefore specified, and the composition could not be formed into a cohesive sheet on the twin roll mill. The composition remained in the form of a crumble.

By way of further comparison the above procedure of Example 3 was repeated except that the hyrolysed polyvinyl acetate was replaced by hydroxy propyl methyl cellulose.

The friction coefficient of the composition was 0.31.

The mean aspect ratio of the particles of ceramic material, 1.49 (see Example 1), was below the upper limit hereinbefore specified, but the friction coefficient of the composition, 0.31, was above the upper limit hereinbefore specified, and the composition could not be formed into a cohesive sheet on the twin-roll mill. The composition remained in the form of a crumble.

EXAMPLE 4

Components of composition.
Particulate ceramic material.
SiO$_2$ as used in Example 2
Organic polymeric material.
Hyrolysed polyvinyl acetate as used in Example 1.
Water.
The components of the composition were mixed in the following proportions by volume.

| SiO$_2$ | 50% |
|---|---|
| Organic polymeric material | 6.4% |
| Water | 43.6% |
| Friction coefficient of the composition | 0.04 |

The mean aspect ratio of the particles of ceramic material and the friction coefficient of the composition were below the upper limits hereinbefore specified, and the composition was readily moulded on the twin-roll mill to produce a shaped article in the form of a cohesive sheet.

EXAMPLE 5

The procedure of Example 2 was repeated except that the organic polymeric material was omitted and the composition comprised 50% by volume of SiO$_2$ and 50% by volume of water. The friction coefficient of the composition was 0.03 and the yield pressure 0.002 MPa and the composition was fluid and readily moulded. By way of comparison, when the proportion of SiO$_2$ in the composition was increased to 57% by volume the friction coefficient increased to 0.38, and the composition was extremely difficult to mould.

EXAMPLE 6

The procedure of Example 2 was repeated except that the organic polymeric material was omitted and the composition comprised 50% by volume of $SiO_2$ and 50% by volume of glycerol (in place of the water of Example 2). The friction coefficient of the composition was 0.03 and the yield pressure 0.1 MPa and the composition was fluid and readily moulded.

EXAMPLE 7

Components of composition.

| Particulate ceramic material. | |
|---|---|
| $Al_2O_3$ | |
| Mean aspect ratio $\overline{X}_a$ | 1.443 |
| Standard deviation about mean aspect ratio $S_a$ | 0.367 |
| Coefficient of variation of aspect ratio $V_a$ | 0.25 |
| Mean size $\overline{X}_s$ | 0.251 micron |
| Standard deviation about mean size $S_s$ | 0.108 micron |
| Coefficient variation of size $V_s$ | 0.43 |
| Density | 3.97 g/cc |
| Organic polymeric material. | |
| Hydrolysed polyvinyl acetate as used in Example 1. | |
| Water. | |

The components of the composition were mixed in the following proportions by volume

| | |
|---|---|
| $Al_2O_3$ | 50% |
| Organic polymeric material | 16.6% |
| Water | 33.4% |
| Friction coefficient of composition | 0.03 |
| Yield pressure | 0.71 MPa |

The composition was readily moulded on a twin-roll mill to produce a cohesive sheet.

The sheet was heated in order to volatilise the water, the resultant shaped article from which the water had been removed was heated at a rate of 1° C. per minute to 450° C. in a furnance to burn off the hydrolysed polyvinyl acetate, and the article was then heated in a furnance at 1550° C. for 0.5 hour in order to sinter the particles of $Al_2O_3$.

The flexural strength of the resultant sintered product was 274±10 MPa. (Weibull modulus 27).

By way of comparison when the above procedure was repeated except that the organic polymeric material was omitted the composition was found to have a friction coefficient of 0.21 when the composition contained only 50% by volume of $Al_2O_3$. The composition could not be formed into a cohesive sheet.

EXAMPLE 8

The procedure of Example 7 was repeated except that the composition contained

| | |
|---|---|
| $Al_2O_3$ | 52.82 by volume |
| Organic polymeric material | 17.59% by volume |
| Water | 29.57% by volume. |

The friction coefficient of the composition was 0.19 and the yield pressure 0.26 MPa and the composition could be formed into a cohesive sheet.

By way of comparison when the above procedure was repeated except that the composition contained

| | |
|---|---|
| $Al_2O_3$ | 55.15% by volume |
| Organic polymeric material | 18.37% by volume |
| Water | 26.47% by volume |

The friction coefficient of the composition was 0.25 and the yield pressure 5 MPa and it could not be formed into a cohesive sheet.

EXAMPLE 9

A composition was formed from the following components

| | |
|---|---|
| $TiO_2$ (as used in Example 1) | 50% by volume |
| Polyacrylamide | 15% by volume |
| 1 g of sodium lignosulphonate in an aqueous solution | 4.4% by volume |
| Water | 31% by volume |

The friction coefficient of the composition was 0.06, and the composition could readily be moulded into a cohesive sheet.

EXAMPLE 10

Components of composition

| $Al_2O_3$ | |
|---|---|
| Mean aspect ratio $\overline{X}_a$ | 1.0 |
| Standard deviation about mean aspect ratio $S_a$ | 0 |
| Coefficient at variation of aspect ratio $V_a$ | 0 |
| Mean size $\overline{X}_s$ | 0.074 micron |
| Standard deviation about mean size $S_s$ | 0.029 micron |
| Coefficient variation of size $V_s$ | 0.39 |
| Density | 3.2 g cm$^{-3}$ |
| Organic Polymeric Material. | |
| Hydroylsed polyvinyl acetate as used in Example 1. | |
| Water | |

The components of the composition were mixed in the following proportions by volume.

| | |
|---|---|
| $Al_2O_3$ | 56.2% |
| Organic polymeric material | 14.9% |
| Water | 28.9% |

The friction coefficient of the composition was 0.03 and the yield pressure 0.71 MPa and the composition could readily be moulded into a cohesive sheet.

By way of comparison when the above procedure was repeated except that the $Al_2O_3$ was replaced by tribasic calcium phosphate having an aspect ratio 4.7 substantially above the maximum of the composition of this invention the friction coefficient of a composition was low (0.03) when the components were present in the following proportions by volume

| | |
|---|---|
| tribasic calcium phosphate | 35.7% |
| organic polymeric material | 18.8% |
| water | 45.5% | but the friction coefficient was high (0.25) when the components of the composition were present in the following proportions by volume

| | |
|---|---|
| tribasic calcium phosphate | 39% |
| organic polymeric material | 42% |
| water | 19% |

In the former case the composition was somewhat plastic. In the latter case it could not be moulded.

EXAMPLE 11

Components of composition.

| | |
|---|---|
| SiC bimodal mixture. | |
| Mode 1 | |
| Mean aspect ratio $\overline{X}_a$ | 1.45 |
| Standard deviation about mean aspect ratio $S_a$ | 0.34 |
| Coefficient of variation of aspect ratio $V_a$ | 0.23 |
| Mean size $\overline{X}_s$ | 0.66 micron |
| Standard deviation about mean size $S_s$ | 0.31 micron |
| Coefficient of variation of size $V_s$ | 0.46 |
| Density | 3.2 g cm$^{-3}$ |
| Mode 2 | |
| Mean aspect ratio $\overline{X}_a$ | 1.46 |
| Standard deviation about mean aspect ratio $S_a$ | 0.45 |
| Coefficient of variation of aspect ratio $V_a$ | 0.31 |
| Mean size $\overline{X}_s$ | 0.094 micron |
| Standard deviation about mean size $S_s$ | 0.032 micron |
| Coefficient of variation of size $V_s$ | 0.35 |
| Density | 3.2 g cm$^{-3}$ |
| Organic polymeric material. | |
| hydrolysed polyvinyl acetate as used in Example 1. | |
| Water | |

The components of the composition were mixed in the following proportions by volume.

| | |
|---|---|
| SiC | 54% |
| Organic polymeric material | 15% |
| Water | 31% |

The friction coefficient of the composition was 0.11 and the yield pressure 0.7 MPa and the composition could readily be moulded into the form of cohesive sheet.

By way of comparison, when a composition was formed from the above components in proportions by volume of

| | |
|---|---|
| SiC | 55% |
| Organic polymeric material | 10% |
| Water | 35% | that is, with a reduced proportion of organic polymeric material, the friction coefficient of the composition was 0.34 and the yield pressure 1.5 MPa and the composition could not be moulded into a cohesive sheet.

EXAMPLE 12

A composition was produced comprising TiO$_2$, as used in Example 1, water, and a copolymer of polyvinyl butyral/polyvinyl alcohol in the following proportions by volume.

| | |
|---|---|
| TiO$_2$ | 50.2% |
| Organic polymeric material | 9.15% |
| Water | 40.65% |
| Friction coefficient of the composition | 0.03. |

The composition could readily be moulded into the form of a cohesive sheet.

We claim:

1. A homogeneous composition comprising
   (1) at least one particulate sinterable ceramic material, and
   (2) a liquid medium, in which the composition comprises at least 50% by volume of particulate ceramic material, in which the particulate ceramic material and liquid medium are selected such that a test composition has a friction coefficient of less than 0.2, and in which the particulate ceramic material has a mean aspect ratio of less than 1.70.

2. A homogeneous composition as claimed in claim 1 in which the particles of ceramic material have a size less than 5 microns.

3. A homogeneous composition as claimed in claim 2 in which the particles of ceramic material have a size less than 1 micron.

4. A homogeneous composition as claimed in claim 1 in which the coefficient of variation in the size of the particles of ceramic material, $V_s$, lies in the range 0 to 0.5, where $$V_s = \frac{S_s}{\overline{x}_s}$$

where
$V_s$ is the coefficient of variation of size,
$S_s$ is the standard deviation about the mean size, and
$\overline{x}_s$ is the mean size of the particles.

5. A homogeneous composition as claimed in claim 4 in which the mean aspect ratio of the particles of ceramic material is less than 1.50.

6. A homogeneous composition as claimed in any one of claims 1, 2 or 4 in which the coefficient of variation in the aspect ratio of the particles of ceramic material, $V_a$, lies in the range 0 to 0.5, where $$V_a = \frac{S_a}{\overline{x}_a}$$

where
$V_a$ is the coefficient of variation of aspect ratio,
$S_a$ is the standard deviation about the mean aspect ratio, and
$\overline{x}_a$ is the mean aspect ratio.

7. A homogeneous composition as claimed in claim 1 in which the liquid medium is liquid at ambient temperature.

8. A homogeneous composition as claimed in claim 7 in which the liquid medium is an aqueous medium.

9. A homogeneous composition as claimed in claim 8 in which the liquid medium comprises a solution or dispersion of an organic polymeric material in a liquid.

10. A homogeneous composition as claimed in claim 9 in which the liquid medium comprises an aqueous solution of a hydrolysed polymer or copolymer of a vinyl ester.

11. A homogeneous composition as claimed in claim 10 in which the hyrolysed polymer or copolymer of a vinyl ester is a hydrolysed polymer or copolymer of vinyl acetate having a degree of hydrolysis in the range 70% to 90%.

12. A homogeneous composition as claimed in any one of claims 9, 10 or 11 in which the concentration of organic polymeric material in the liquid medium is in the range 5% to 60% by volume.

13. A homogeneous composition as claimed in claim 8 in which the liquid medium comprises a surfactant.

14. A homogeneous composition as claimed in claim 1 in which the particulate ceramic material comprises an oxide or a mixture of oxides of a metallic or non-metallic element.

15. A homogeneous composition as claimed in claim 14 in which the particulate ceramic material is selected from an oxide of aluminium, silicon, titanium an zirconium.

16. A homogeneous composition as claimed in any one of claims 1 to 13 in which the particulate ceramic material comprises silicon carbide.

17. A homogeneous composition as claimed in any one of claims 1, 2 or 4 which comprises more than 60% by volume of particulate ceramic material.

18. A homogeneous composition as claimed in any one of claims 1, 2 or 4 in which the friction coefficient is less than 0.10.

19. A homogeneous composition as claimed in claim 1 in which the friction coefficient is less than 0.05.

20. A shaped article of a composition as claimed in claim 1.

21. A shaped article as claimed in claim 20 from which the liquid of the liquid medium has been removed.

22. A shaped article as claimed in claim 21 from which the liquid medium has been removed.

23. A product in which the particles of ceramic material in a shaped article as claimed in claim 22 have been sintered.

* * * * *